United States Patent
Ganesh et al.

(10) Patent No.: US 11,204,820 B2
(45) Date of Patent: *Dec. 21, 2021

(54) FAILURE DETECTION FOR CENTRAL ELECTRONICS COMPLEX GROUP MANAGEMENT

(71) Applicant: International Business Machines Corporation, Armonk, NY (US)

(72) Inventors: Perinkulam I. Ganesh, Round Rock, TX (US); Ravi Shankar, Austin, TX (US); Esdras Cruz-Aguilar, Round Rock, TX (US); Jes Kiran Chittigala, Kukatpally (IN); Michael Burton, Austin, TX (US); Corradino Jones, Austin, TX (US); Denise Marie Genty, Austin, TX (US); James Pafumi, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/858,966

(22) Filed: Apr. 27, 2020

(65) Prior Publication Data
US 2020/0257599 A1 Aug. 13, 2020

Related U.S. Application Data

(63) Continuation of application No. 16/184,081, filed on Nov. 8, 2018, now Pat. No. 10,713,138.

(51) Int. Cl.
*G06F 11/07* (2006.01)
*G06F 11/20* (2006.01)
*G06F 3/06* (2006.01)

(52) U.S. Cl.
CPC ........ *G06F 11/0775* (2013.01); *G06F 3/0644* (2013.01); *G06F 11/073* (2013.01); *G06F 11/2094* (2013.01)

(58) Field of Classification Search
CPC .. G06F 3/0644; G06F 11/073; G06F 11/0775; G06F 11/2094
See application file for complete search history.

(56) References Cited

U.S. PATENT DOCUMENTS 8,055,933 B2 11/2011 Jaehde et al.
8,560,628 B2 * 10/2013 Ganti .................. G06F 9/45558
709/213

(Continued)

OTHER PUBLICATIONS

Ganesh et al., "Failure Detection for Central Electronics Complex Group Management," U.S. Appl. No. 16/184,081, filed Nov. 8, 2018.

(Continued)

*Primary Examiner* — Joseph R Kudirka
(74) *Attorney, Agent, or Firm* — Cator Colburn LLP; Nathan Rau

(57) ABSTRACT

Examples of techniques for failure detection for central electronics complex (CEC) group management are described herein. An aspect includes issuing a first virtual input/output server (VIOS) probe to a hardware management console (HMC) of a central electronics complex (CEC) group. Another aspect includes receiving a first response packet that includes health data corresponding to a plurality of VIOSes. Another aspect includes determining, based on the first response packet, that cluster down is indicated on a first VIOS. Another aspect includes, based on determining that cluster down is indicated on the first VIOS, getting a VIOS state for the first VIOS from the HMC. Another aspect includes determining based on the VIOS state that the first VIOS is in a down state and determining that the first VIOS (Continued)

is unhealthy. Another aspect includes updating a health data entry corresponding to the first VIOS to indicate that the first VIOS is unhealthy.

20 Claims, 10 Drawing Sheets

(56) References Cited

U.S. PATENT DOCUMENTS

| | | | |
|---|---|---|---|
| 9,626,262 B1* | 4/2017 | Vogel | ................. H04L 43/10 |
| 2014/0351636 A1 | 11/2014 | Yin et al. | |
| 2018/0095845 A1 | 4/2018 | Sanakkayala et al. | |

OTHER PUBLICATIONS

IBM "List of IBM Patents or Patent Applications Treated as Related; (Appendix P)", Filed Apr. 28, 2020, 2 pages.

* cited by examiner

```
<VIO><Response>
<quickQuery>
<viosStatList><viosStatus machine_type="8408" model="E8D" serial="21DD53T">
<viosStat uuid="53fff3c9-de8b-40fb-8a70-7f4aa527a840" state="UP" hmResponsive="1"
         hmResponseSec='1' hasData='0' reason='0x00000000' syncMsg="0" />
<viosStat uuid="0c50c72c-56d9-46fc-ab1b-aefb9cf109e7" state="UP" hmResponsive="1"
         hmResponseSec='1' hasData='0' reason='0x00000000' syncMsg="0" />
</viosStatus></viosStatList>
</quickQuery>
<quickQuery>
<viosStatList><viosStatus machine_type="8205" model="E6D" serial="106E71T">
<viosStat uuid="03ee3014-5455-4923-819a-dc5aa8c4d35c" state="UP" hmResponsive="1"
         hmResponseSec='1' hasData='0' reason='0x00000000' syncMsg="0" />
<viosStat uuid="388bc68d-d728-4be8-b1fc-22e8b3f06082" state="UP" hmResponsive="1"
         hmResponseSec='0' hasData='0' reason='0x00000001' syncMsg="0" />
</viosStatus></viosStatList>
</quickQuery>
</Response></VIO>
```

VIOS RESPONSE PACKET 801

```
<VIO><Response>
<needsAtt> <vmStatList>
<vmList machine_type="8408" model="E8D" serial="21DD4FT">
<vmStat uuid="5414b597-27cc-4e92-b311-1dca9c68d989">
         <VM state="STARTED" missedHb='186'>
</VM> </vmStat>
<vmStat uuid="472dde1b-3a35-4b8d-8fa3-33d3d8b99c4f">
         <VM state="STARTED" missedHb='196'>
</VM> </vmStat>
<vmStat uuid="5486f4ca-6196-4df8-9216-50019819efc8">
         <VM state="STARTED" missedHb='181'>
</VM> </vmStat>
<vmStat uuid="2e3afee0-6046-43d9-bae6-6353e3509bd0">
         <VM state="STARTED" missedHb='186'>
</VM> </vmStat>
</vmList>
</vmStatList> </needsAtt>
<needsAtt> <vmStatList>
<vmList machine_type="8246" model="L2T" serial="060609A">
</vmList>
</vmStatList> </needsAtt>
</Response></VIO>
```

LPAR RESPONSE PACKET 802

FIG. 8

FAILURE DETECTION FOR CENTRAL ELECTRONICS COMPLEX GROUP MANAGEMENT

DOMESTIC PRIORITY

This application is a continuation of U.S. patent application Ser. No. 16/184,081, filed Nov. 8, 2018, the disclosure of which is incorporated by reference herein in its entirety.

BACKGROUND

The present techniques relate to computer systems. More specifically, the techniques relate to failure detection for central electronics complex (CEC) group management.

Business continuity requires that a user, such as a company, have a highly available information technology (IT) infrastructure. Cluster-based high availability solutions may provide high availability management. However, with the sprawl of IT infrastructure, cluster-based high availability management may be relatively complex to deploy and manage. An underlying physical infrastructure may be provisioned as a central electronics complex (CEC) group. CEC group management may provide high availability management for a group of computer servers that host a number of logical partitions (LPARs). The CEC is a building block of central processing units (CPUs), physical memory, and peripheral component interconnect (PCI) backplane that is interconnected. At the basic level, a CEC may be one or more physical servers. A CEC group may provide and monitor a relatively large number of CECs and LPARs (e.g., in the order of hundreds) in an IT infrastructure, and relocate individual LPARs, or entire LPARS within a CEC, in the physical IT infrastructure as needed.

LPARs are virtualized via virtual input/output servers (VIOSes). The physical computer resources of the CEC, including but not limited to memory and network adapters, are not dedicated to individual LPARs, but rather are shared among the LPARs via the VIOSes, which own the physical computer resources. Each VIOS may run within its own LPAR. A VIOS provides virtualized storage for its associated LPARs. Therefore, each VIOS needs enough storage space for the associated LPARs. The storage space may be provided by a disk storage system, for example, in a storage area network (SAN) environment; however, any other appropriate storage system or group of local disks may be supported and managed by VIOS.

SUMMARY

Embodiments of the present invention are directed to failure detection for central electronics complex (CEC) group management. A non-limiting example computer-implemented method includes issuing a first virtual input/output server (VIOS) probe to a hardware management console (HMC) of a central electronics complex (CEC) group, wherein the CEC group includes a plurality of CECs, and wherein each CEC comprises at least one respective VIOS. The method also includes receiving a first response packet from the HMC corresponding to the first VIOS probe, wherein the first response packet includes health data corresponding to a plurality of VIOSes of the CEC group. The method also includes determining, based on the first response packet, that cluster down is indicated on a first VIOS associated with a first CEC. The method also includes, based on determining that cluster down is indicated on the first VIOS, getting a VIOS state for the first VIOS from the HMC. The method also includes determining based on the VIOS state from the HMC that the first VIOS is in a down state. The method also includes, based on determining that the first VIOS is in the down state, determining that the first VIOS is unhealthy. The method also includes updating a first health data entry corresponding to the first VIOS to indicate that the first VIOS is unhealthy.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8 illustrates example response packets for failure detection for CEC management.

DETAILED DESCRIPTION

Figure 1:
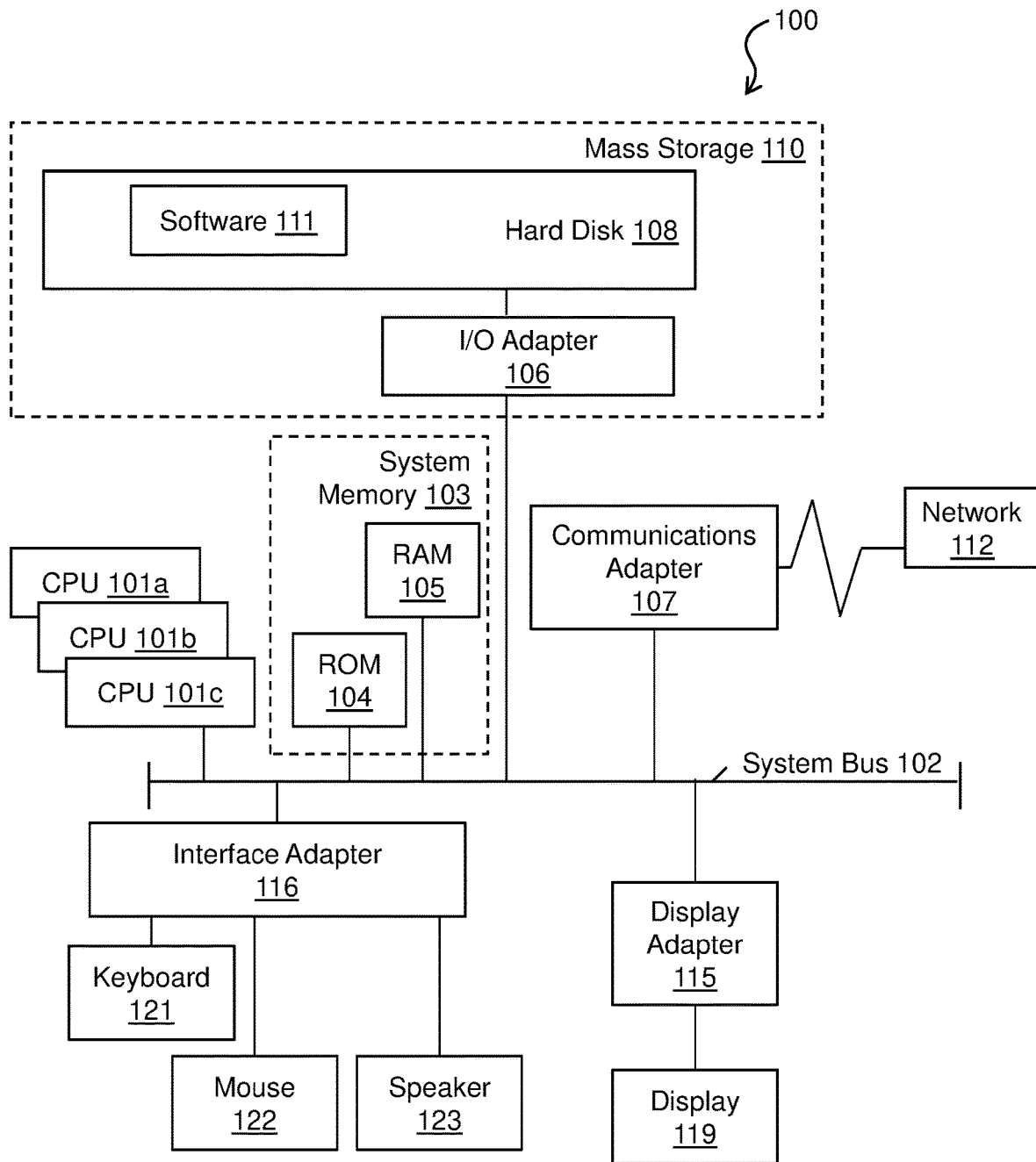
FIG. 1 is a block diagram of an example computer system that may be used in conjunction with failure detection for central electronics complex (CEC) group management.

One or more embodiments of the present invention provide failure detection for CEC group management. An orchestrating software, or controller system (KSYS), runs on a partition (for example, an external LPAR or physical machine) that is outside of the CEC group topology it is monitoring. A failure detection engine (FDE) may be provided in the controller system to make relocation decisions for LPARs and VIOSes in the CEC group.

Due to security concerns, the controller system may not be permitted to communicate directly with LPARS and VIOSes in the CEC group. Rather, communications between the controller system and the VIOSes and LPARs is performed via a hardware management console (HMC). The VIOSes and LPARs managed by an HMC may not be permitted to initiate messages to the controller system via the HMC; therefore, health monitoring of the VIOSes and LPARS in the CEC group by the FDE in the controller system cannot be event-driven. The HMC may be a relatively lightweight computer system. Therefore, the controller system may overload HMC with health status queries if the health status queries are sent too frequently, negatively affecting other HMC operations. A relatively large packet sent in response to a REST API query may also negatively affect HMC operations.

The FDE may periodically obtain the health of the VIOSes and the LPARs within the CEC group by sending probes comprising representational state transfer (REST) application programming interface (API) queries from the controller system to the one or more HMCs that manage the CEC group. A REST API query is passed through the HMC to the VIOS, and may be used to probe the health of any VIOS or LPAR that resides in any one of the CECs that is in communication with the HMC. The VIOS may respond to the REST API query via the HMC with a response packet comprising an XSD (extensible markup language schema definition) packet containing the requested health data for the VIOSes and/or LPARs.

In order to reduce traffic through the HMC, the FDE may send a probe comprising REST API queries to the HMC at predefined time intervals (e.g., once every 20 seconds). A first REST API query type may collect health information regarding VIOSes, and a second REST API query type may collect health information from the LPARs. In some embodiments, the REST API queries of the first type are sent more frequently than REST API queries of the second type, i.e., the health of the VIOSes is monitored more frequently than the health of the LPARS. In order to reduce the bandwidth of the health data that is passed back to the FDE via the HMC in the XSD packets, in some embodiments, only data regarding any LPARs that are exhibiting problems (e.g., missed heartbeats) is returned in the XSD response packet. The FDE uses the information from the XSD response packets to make relocation decisions.

In some embodiments, each CEC may have two VIOSes. If both VIOSes within a CEC are determined to be unhealthy by the FDE, the FDE may instruct the controller system to relocate all the LPARs within that CEC to a different CEC. Both VIOSes are checked by FDE before attempting relocation of entire CEC. In some embodiments, the VIOSes are clustered together using a shared storage pool (SSP) cluster, so that health data regarding the entire topology is shared among the VIOSes. Therefore, if the state of a VIOS is DOWN from the cluster perspective, other VIOSes within the cluster are aware of the down state due to the clustering. Further, the health of any LPAR in the CEC group will be available to any VIOS due to the clustering. If an individual LPAR is detected to be unhealthy by a VIOS (due to, for example, missed heartbeats), the VIOS may notify the FDE. The FDE may instruct the controller system to relocate the unhealthy LPAR to another CEC within the CEC group.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
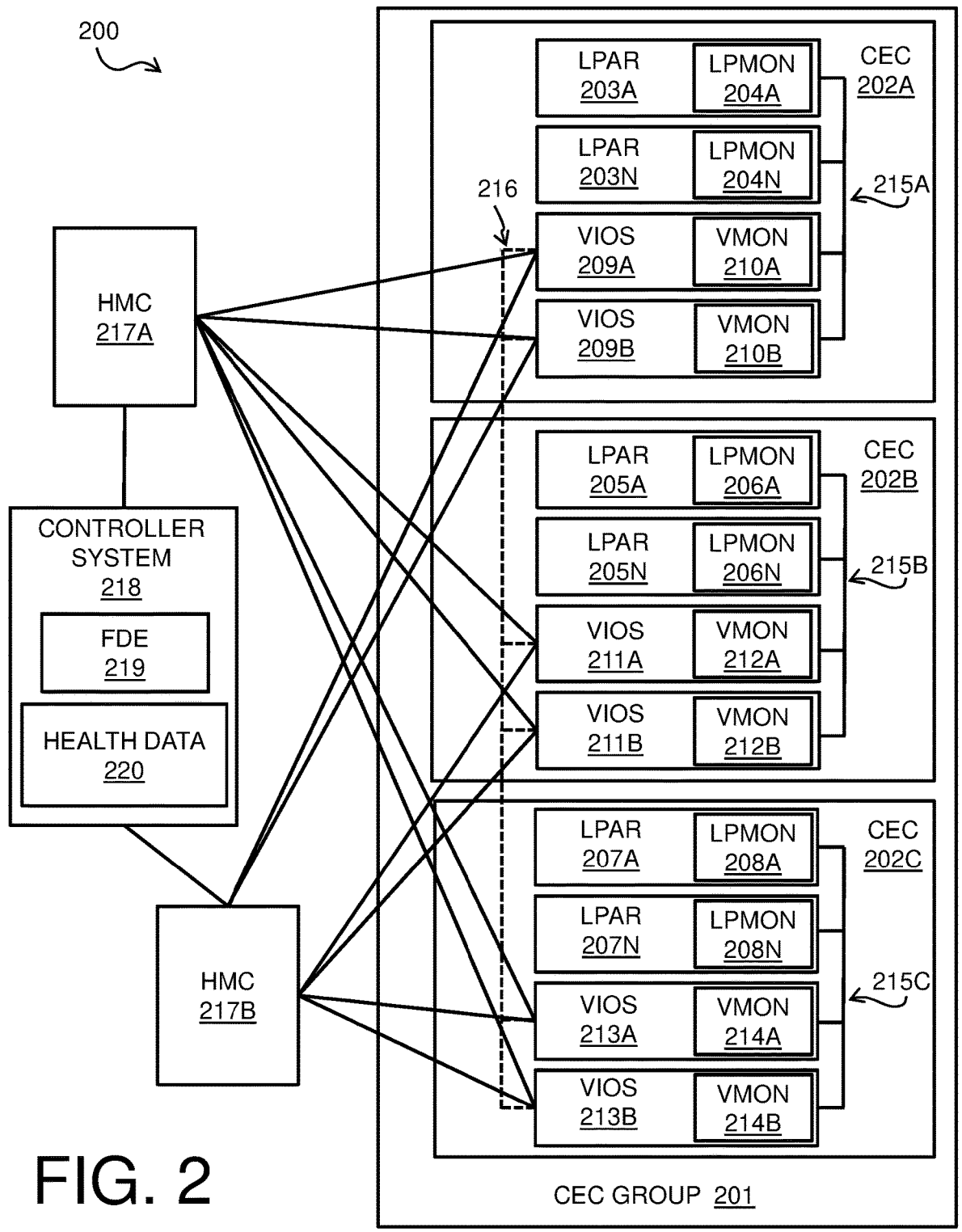
FIG. 2 is a block diagram of a system including a CEC group and a failure detection engine (FDE)

FIG. 2 is a block diagram of an embodiment of a system 200 comprising a CEC group 201. System 200 may include any appropriate number of computer systems such as computer system 100 of FIG. 1, and the computer systems may be interconnected and configured in any appropriate manner. The physical computer system that makes up system 200 hosts a plurality of CECs 202A-C that make up CEC group 201. The physical computer system that makes up system 200 may be located in any appropriate physical space, for example, in a single building or across multiple buildings, in various embodiments.

CEC 202A includes a plurality of LPARs 203A-N; a CEC such as CEC 202A may include any appropriate number of LPARs. Each of LPARs 203A-N includes a respective LPAR monitor 204A-N. CEC 202A further includes two VIOSes 209A and 209B. Each of VIOSes 209A-B includes a respective VIOS monitor 210A-B. LPARs 203A-N and VIOS 209A-B in CEC 202A are connected by VLAN 215A. The VIOSes 209A-B provide access to the physical resources of the underlying computer system to the LPARs 203A-N in CEC 202A. LPAR monitors 204A-N may report health data (e.g., heartbeats) to the VIOSes 209A-B. VIOS monitors 210A-B may collect the LPAR health data from LPARs 209A-B. The VIOS monitors 210A-B may receive REST API queries, and send LPAR and VIOS health data in XSD response packets, via either HMC 217A-B.

CEC 202B includes a plurality of LPARs 205A-N; a CEC such as CEC 202B may include any appropriate number of LPARs. Each of LPARs 205A-N includes a respective LPAR monitor 206A-N. CEC 202A further includes two VIOSes 211A and 211B. Each of VIOSes 211A-B includes a respective VIOS monitor 212A-B. LPARs 205A-N and VIOS 211A-B in CEC 202B are connected by VLAN 215B. The VIOSes 2011A-B provide access to the physical resources of the underlying computer system to the LPARs 205A-N in CEC 202B. LPAR monitors 206A-N may report health data (e.g., heartbeats) to the VIOSes 211A-B. VIOS monitors 212A-B may collect the LPAR health data from LPARs 205A-B. The VIOS monitors 212A-B may receive REST API queries, and send LPAR and VIOS health data in XSD response packets, via either HMC 217A-B.

CEC 202C includes a plurality of LPARs 207A-N; a CEC such as CEC 202C may include any appropriate number of LPARs. Each of LPARs 207A-N includes a respective LPAR monitor 208A-N. CEC 202C further includes two VIOSes 213A and 213B. Each of VIOSes 213A-B includes a respective VIOS monitor 214A-B. LPARs 207A-N and VIOS 213A-B in CEC 202C are connected by VLAN 215C. The VIOSes 213A-B provide access to the physical resources of the underlying computer system to the LPARs 207A-N in CEC 202C. LPAR monitors 208A-N may report health data (e.g., heartbeats) to the VIOSes 213A-B. VIOS monitors 214A-B may collect the LPAR health data from LPARs 207A-B. The VIOS monitors 214A-B may receive REST API queries, and send LPAR and VIOS health data in XSD response packets, via either HMC 217A-B.

CECs 202A-C in CEC group 201 make up a shared storage pool (SSP) 216, which connects each of the VIOSes 209A-B, 211A-B, and 213A-B across CECs 202A-C. Health data regarding the entire CEC group 201 is shared among the VIOSes 209A-B, 211A-B, and 213A-B in the SSP 216. HMCs 217A-B interface with the VIOSes 209A-B, 211A-B, and 213A-B across CECs 202A-C. Multiple HMCs are provided for high availability, e.g., if one HMC goes down, the controller system may probe the CEC group 201 via the remaining HMC. Any appropriate number of HMCs may be in communication with a CEC group and a controller system in various embodiments. Controller system 218 is located outside of the CEC group 201, and communicates with the CECs 202A-C via the HMCs 217A-B. Controller system 218 may instruct the HMCs 217A-B to relocate LPARs and/or CECs in the CEC group 201. FDE 219 is located in controller system 218. FDE 219 collects health data regarding the VIOSes 209A-B, 211A-B, and 213A-B, and LPARs 203A-N, 205A-N, and 207A-N, by initiating probes that are sent from the controller system 218 via the HMCs 217A-B. The FDE maintains LPAR and VIOS health data 220 for the CEC group 201 based on the XSD response packets that are returned in response to the probes, and makes decisions regarding moving LPARs and/or CECs in the system 200 based on the LPAR and VIOS health data 220. The LPAR and VIOS health data 220 may be any appropriate type of data structure that is stored in the memory of the controller system 218. The LPAR and VIOS health data 220 may include respective entries including health data corresponding to each of the VIOSes 209A-B, 211A-B, or 213A-B and LPARs 203A-N, 205A-N, and 207A-N in the CEC group 201. The controller system 218 controls the CEC group 201 via HMCs 217A-B based on the relocation decisions made by the FDE 219.

In some embodiments, a controller system 218 in a system 200 may be in communication with multiple islands, which may each comprise one or more CEC groups that are isolated from one another. In such embodiments, probing any a single VIOS by the FDE 219 may not give the health of the entire topology of the system, but rather only information regarding VIOSes and LPARs located in the same island. For example, when FDE 219 receives an XSD response packet from a VIOS such as VIOS 209A, the XSD response packet may also include health information for any VIOSes and/or LPARS that are in the same island as the responding VIOS 209A, but not for any VIOSes and/or LPARS that are located in a different island. Therefore, the FDE 219 may send VIOS and LPAR probes separately to on any islands that are in communication with the FDE 219. The FDE 219 may determine based on received XSD response packets which VIOSes and LPARS are in which islands, and record this topology information in the LPAR and VIOS health data 220.

In some embodiments, within each of CECs 202A-C, the LPARs send periodic heartbeat data to the associated VIOSes. For example, in CEC 202A, LPARs 203A-N send periodic heartbeat data to VIOSes 209A-B. The VIOSes 209A-B keep a count of missed heartbeats for each of LPARs 203A-N in the CEC 202A. In response to a REST API query comprising an LPAR probe that is issued to a VIOS 209A by FDE 219 via an HMC of HMCs 217A-B, the VIOS 209A may respond with an XSD response packet comprising a list including only LPARs in CEC group 201 that have missed heartbeats.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional controller systems, LPAR and VIOS health data, FDEs, HMCs, islands, CEC groups, CECs, VIOSes, LPARs, VLANs, SSPs, etc.). For example, a CEC may have any appropriate number of VIOSes in various embodiments, and a controller system may be in communication with any appropriate number of CEC groups, which may be divided into any appropriate number of islands. Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
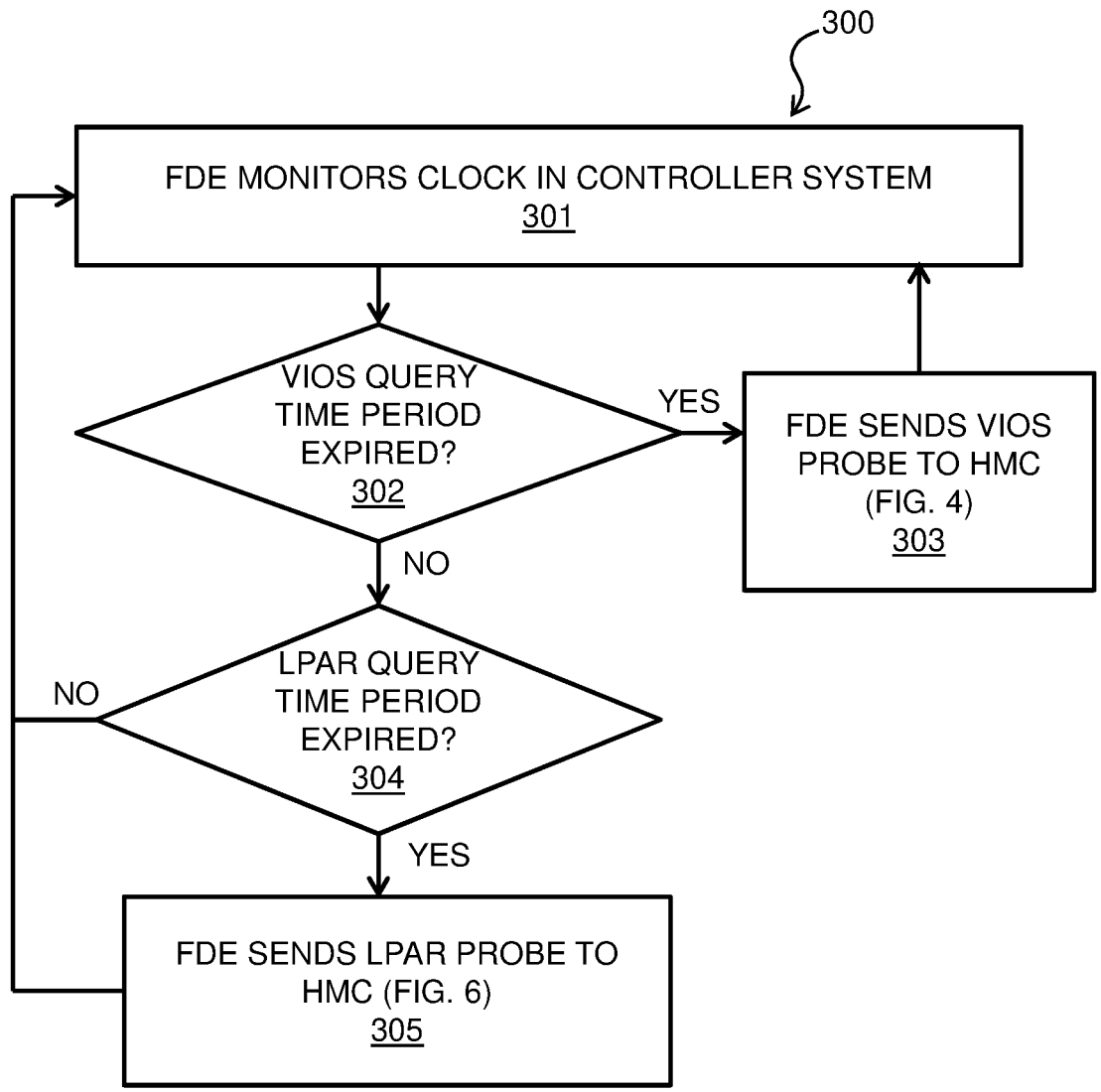
FIG. 3 is a process flow diagram for virtual input/output server (VIOS) and logical partition (LPAR) monitoring in a CEC group by an FDE.

FIG. 3 is a process flow diagram of an example method for VIOS and LPAR monitoring for failure detection for CEC group management. The method 300 can be implemented in a system such as system 200 of FIG. 2, in conjunction with any suitable computing device, such as the computer system 100 of FIG. 1. In block 301, an FDE 219 monitors a clock in the controller system 218. In block 302, it is determined whether a VIOS health query time period has expired based on the monitoring of the clock. The VIOS health query time period may be any appropriate amount of time (e.g., 20 seconds) in various embodiments. In some embodiments the VIOS health query time period may be set by, for example, an administrator of the CEC group 201. If it is determined in block 302 that the VIOS health query time period has expired, flow proceeds from block 302 to block 303, and the FDE sends a VIOS probe comprising a REST API query to an HMC of HMCs 217A-B. The handling of a VIOS probe is discussed in further detail with respect to FIGS. 4A-B and FIG. 5. From block 303, flow proceeds back to block 301, and the FDE 219 continues monitoring the clock.

If it is determined in block 302 that the VIOS health query time period has not expired, flow proceeds to block 304, in which it is determined whether an LPAR health query time period has expired. The LPAR health query time period may be any appropriate amount of time in various embodiments; in some embodiments, the LPAR health query time period is longer than the VIOS health query time period, so that the VIOSes are monitored more frequently than the LPARs. In some embodiments the LPAR health query time period may be set by, for example, an administrator of the CEC group 201. If it is determined in block 304 that the LPAR health query time period has not expired, flow proceeds from block 304 back to block 302, and the FDE 219 continues monitoring the clock. If it is determined in block 304 that the LPAR health query time period has expired, flow proceeds from block 304 to block 305, in which an LPAR probe comprising a REST API query is sent to an HMC of HMCs 217A-B. The handling of an LPAR probe is discussed in further detail with respect to FIG. 6 and FIGS. 7A-B. From block 305, flow proceeds back to block 301 of method 300, and the FDE 219 continues monitoring the clock. Method 300 of FIG. 3 may be performed continuously during the operation of FDE 219, so that VIOS probes and LPAR probes are periodically sent to an HMC of HMCs 217A-B to collect health data from the CECs 202A-C.

The sending of the VIOS and LPAR probes as described in FIG. 3 may be performed based on the topology of the system 200 in some embodiments. For example, CEC group 201 may comprise an island that is isolated from another CEC group that is in communication with the FDE 219. In such an example, the FDE may determine that a VIOS or LPAR probe needs to be sent separately to each of the islands that are in communication with the FDE 219.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4A:
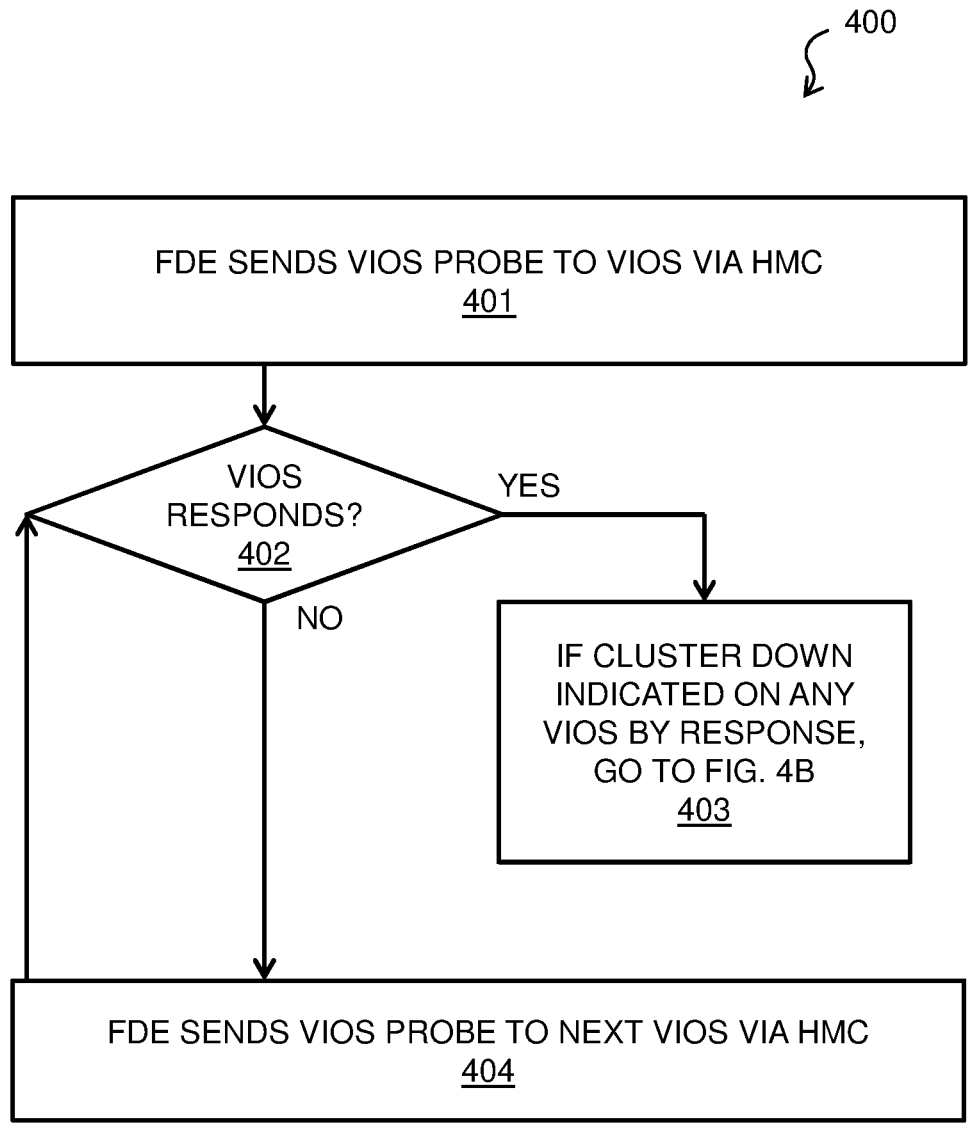
FIGS. 4A-B are process flow diagrams of an example method for VIOS monitoring for failure detection for CEC group management.
Figure 4B:
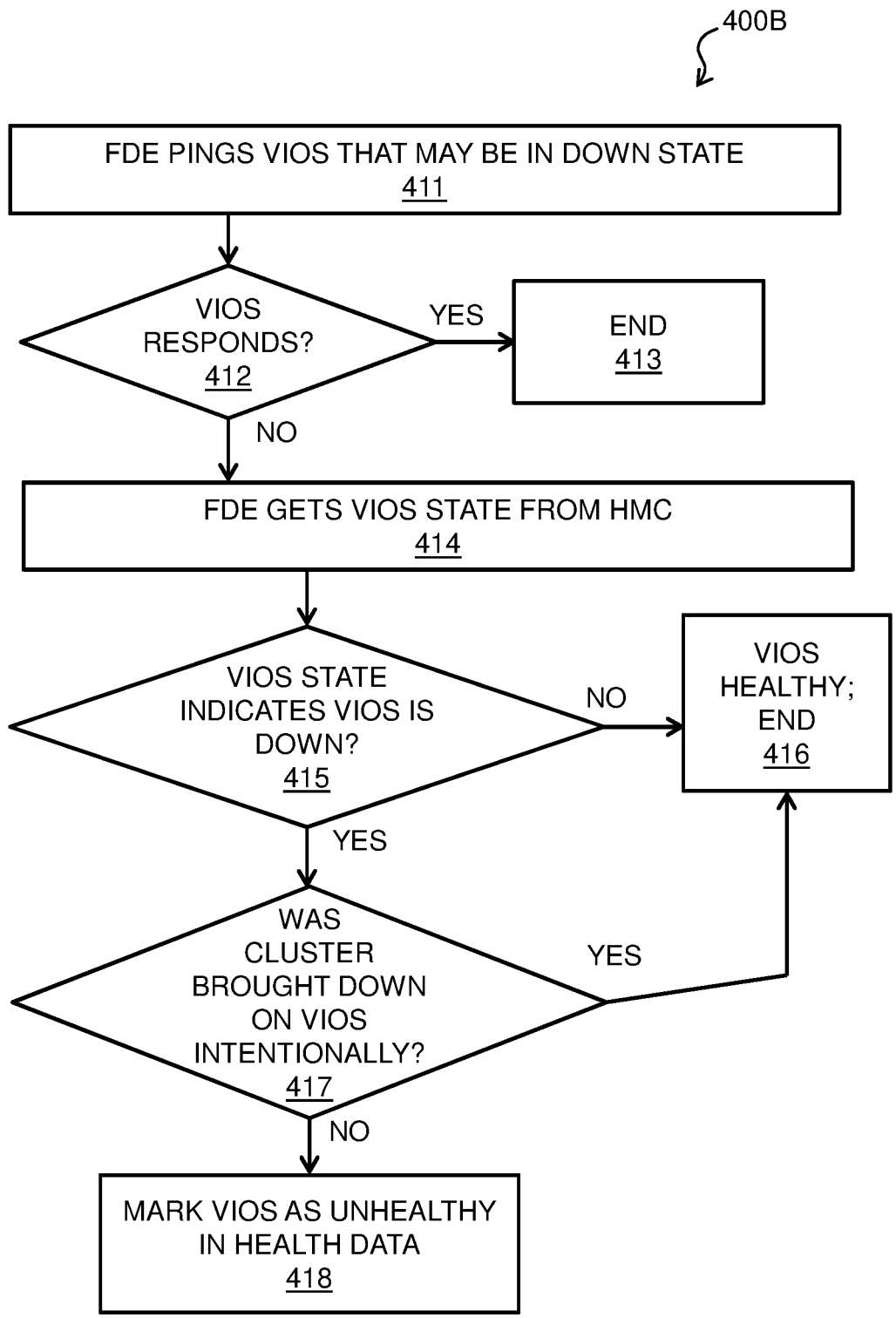

FIGS. 4A-B are process flow diagram of an example method for VIOS monitoring for failure detection for CEC group management. The methods 400A-B can be implemented in a system such as system 200 of FIG. 2, in conjunction with any suitable computing device, such as the computer system 100 of FIG. 1. Methods 400A-B of FIGS. 4A-B may be performed in block 303 of method 300 of FIG. 3. In block 401 of method 400A of FIG. 4A, the FDE 219 sends a VIOS probe to a VIOS (for example, VIOS 209A) in the CEC group 210 via an HMC of HMCs 217A-B. In block 402, it is determined whether the VIOS 209A responded to the VIOS probe that was sent in block 402. If it is determined that the VIOS 209A sent a response packet, which may comprise an XSD packet that includes health and state data for a plurality of VIOSes in the CEC group 201, then flow proceeds from block 402 to block 403. In block 403, if the response packet indicates cluster down on any of VIOS in the CEC group 201, method 400B of FIG. 4B is triggered for any VIOS for which cluster down is indicated. If cluster down is not indicated for any VIOSes by the response packet, method 400A ends in block 403.

If it is determined in block 402 that the VIOS 209A did not respond to the VIOS probe, flow proceeds from block 402 to block 404. In block 404, the FDE 219 sends another VIOS probe to a next VIOS (for example, VIOS 209B) in the CEC group 201 via an HMC of HMCs 217A-B. Flow then proceeds back to block 402, in which it is determined whether the VIOS 209B responded to the VIOS probe that was sent in block 404. Blocks 402 and 404 of method 400A may be repeated until a VIOS in the CEC group 201 responds to the VIOS probe that is sent by the FDE 219 in block 404. In some embodiments, if no VIOS in the CEC group 201 responds to the VIOS probes that are sent by the repetition of block 404 of method 400A, the FDE 219 may generate an event to notify a user, and continue polling the VIOSes in the CEC group 201 according to method 400A. A lack of response in block 402 may indicate, in some embodiments, a network connectivity issue between the HMCs 217A-B and the VIOSes (i.e., there may not be a problem with the VIOSes).

Method 400B of FIG. 4B may confirm whether or not any VIOS for which cluster down was indicated by the response packet in block 403 of method 400A of FIG. 4A is actually in a down state. Turning to method 400B of FIG. 4B, in block 411, the FDE 219 pings the VIOS (for example, VIOS 209A) for which cluster down was indicated in block 403 of method 400A FIG. 4A. In block 412, it is determined whether there was any response to the ping from the VIOS 209A. In some embodiments, the FDE 219 does not have permission to directly ping the VIOSes in the CEC group 201 due to security concerns. However, in embodiments in which the FDE can ping the VIOSes in CEC group 201, if there is a response in block 412, flow proceeds to block 413, in which it is determined that the VIOS 209A is healthy, and method 400B ends.

If there was no response from the VIOS 209A in block 412, flow proceeds from block 412 to block 414, in which the FDE 219 requests the VIOS state of the VIOS 209A from an HMC (for example HMC 217A) of HMCs 217A-B. The HMC 217A sends the VIOS state for VIOS 209A that is stored in the HMC 217A to the FDE 219 in block 414. Flow then proceeds to block 415, in which it is determined, based on the VIOS state from the HMC 217A, whether the VIOS 209A is a down state. The down state may be indicated by a VIOS state comprising any of "NOT ACTIVATED", "NOT AVAILABLE", or "OPEN FIRMWARE", in various embodiments. If it is determined in block 415 based on the VIOS state from the HMC 217A that the VIOS 209A is not in a down state, it is determined that the VIOS 209A is healthy. For example, the VIOS may be booting up, or may be waiting for input from an administrator of the CEC group 201. Based on determining that the VIOS 209A is healthy, flow proceeds from block 415 to block 416, and method 400B ends.

If it is determined in block 415 that the VIOS 209A is in a down state, flow proceeds from block 415 to block 417. In block 417, it is determined based on the VIOS state from the HMC 217A whether the cluster was brought down on the VIOS 209A intentionally by, for example, an administrator of the CEC group 201. If it is determined in block 417 that the cluster was brought down intentionally on the VIOS 209A, it is determined that the VIOS 209A is healthy, so flow proceeds from block 417 to block 416, and method 400B ends. If it is determined in block 417 that the cluster was not brought down intentionally on the VIOS 209A, then flow proceeds from block 417 to block 418. In block 418, the VIOS 209A is marked as unhealthy in the LPAR and VIOS health data 220 by the FDE 219. An unhealthy VIOS (e.g., a VIOS that is stuck in open firmware) is incapable of serving the LPARs in the CEC in which the VIOS is located. If all VIOSes in a CEC are determined to be unhealthy according to methods 400A-B of FIGS. 4A-B, the LPARs in the CEC may be relocated. This is discussed below with respect to FIG. 5.

The process flow diagrams of FIGS. 4A-B are not intended to indicate that the operations of the methods 400A-B are to be executed in any particular order, or that all of the operations of the methods 400A-B are to be included in every case. Additionally, the methods 400A-B can include any suitable number of additional operations.

Figure 5:
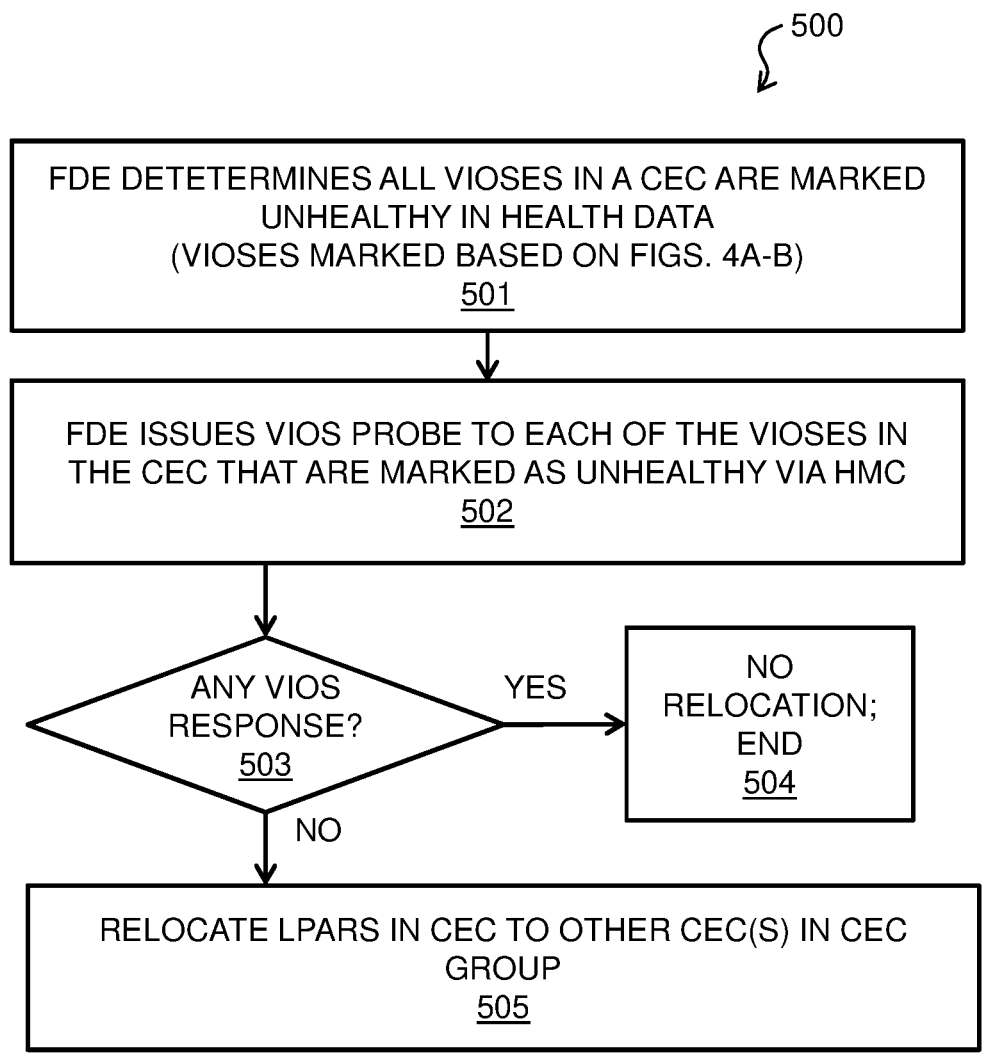
FIG. 5 is a process flow diagram of an example method for CEC monitoring and relocation for failure detection for CEC group management.

FIG. 5 is a process flow diagram of an example method for CEC monitoring and relocation for failure detection for CEC group management. The method 500 can be implemented in a system such as system 200 of FIG. 2, in conjunction with any suitable computing device, such as the computer system 100 of FIG. 1. In block 501 of method 500, the FDE 219 determines based on the LPAR and VIOS health data 220 that all of the VIOSes in a single CEC (for example, VIOSes 209A-B in CEC 202A) are marked as unhealthy. Each of the VIOSes 209A-B in the CEC 202A may have been separately determined to be in an unhealthy state in block 418 of FIG. 4B, as described above with respect to methods 400A-B of FIG. 4A. Next, in block 502, the FDE 219 issues a VIOS probe comprising a REST API query to each of the VIOSes 209A-B in the CEC 201A that were identified in block 501 via an HMC of HMCs 217A. The VIOS probes are issued in block 502 to recheck the health of the VIOSes before relocation of the LPARs. In block 503, it is determined whether there is any response from any of the VIOSes 209A-B that were sent the VIOS probe in block 502. If there is any response from any of the VIOSes 209A-B in block 503, flow proceeds to block 504, in which it is determined that the responding VIOS is healthy, so there is no relocation of the LPARS 203A-B of CEC 202A, and method 500 ends. If no response was received from any VIOS 209A-B in block 503, flow proceeds from block 503 to block 505, in which the FDE 219 instructs the controller system 218 to initiate relocation the LPARs 203A-N in the CEC 202A to a different CEC (such as CECs 202B or 202C) within the CEC group 201. The relocation of LPARs 203A-N may be performed based on resource availability (such as processor resources and/or memory resources) in the other CECs such as CECs 202B or 202C.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
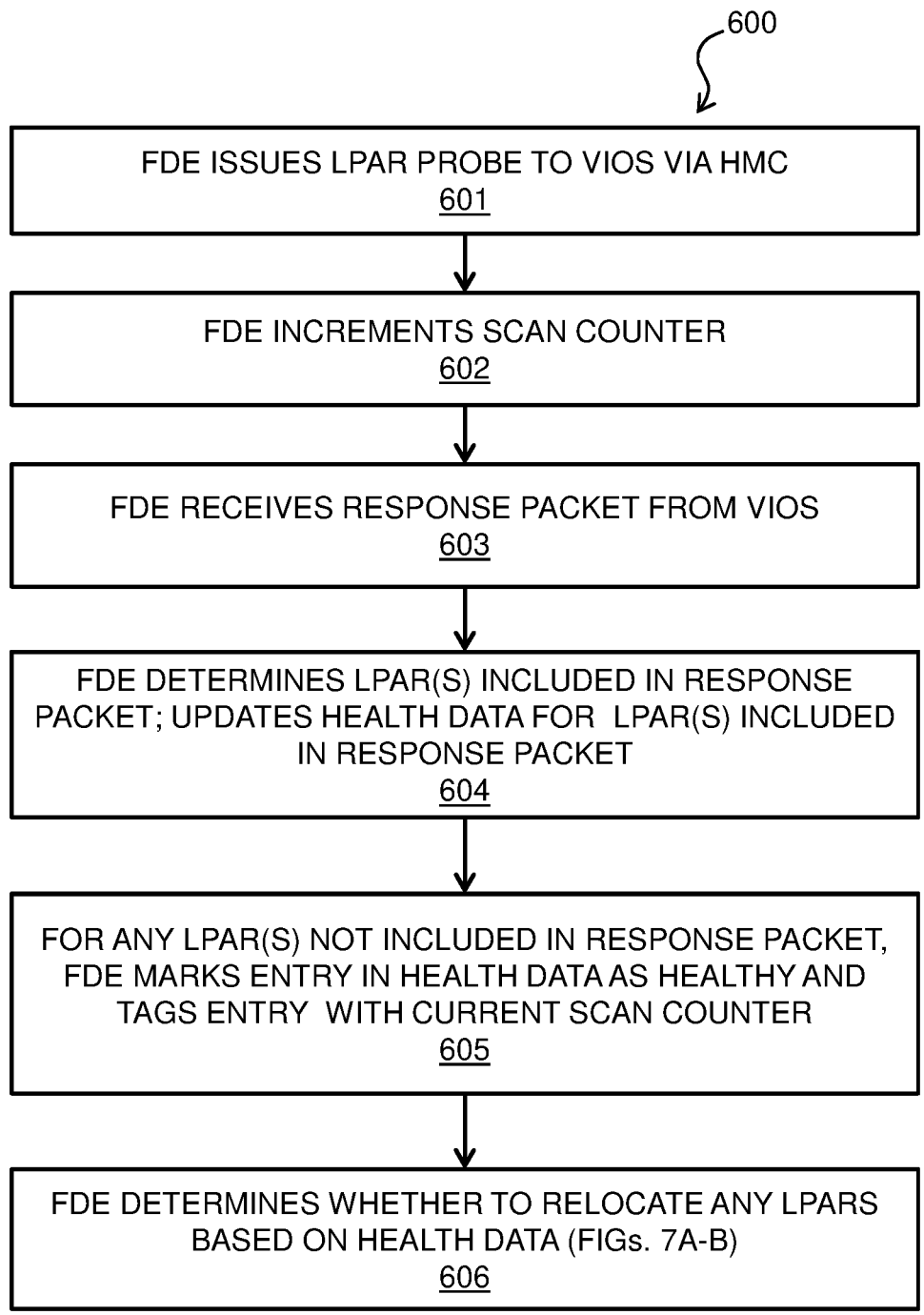
FIG. 6 is a process flow diagram of an example method for LPAR monitoring for failure detection for CEC group management.

FIG. 6 is a process flow diagram of an example method for LPAR monitoring for failure detection for CEC group management. The method 600 can be implemented in a system such as system 200 of FIG. 2, in conjunction with any suitable computing device, such as the computer system 100 of FIG. 1. Method 600 may be performed in block 305 of method 300 of FIG. 3. In block 601 of method 600, the FDE 219 issues an LPAR probe comprising a REST API query to a VIOS such as VIOS 209A via an HMC of HMCs 217A-B. In block 602, the FDE increments a scan counter. The scan counter gives a number of the current scan, or LPAR probe, and indicates when the LPARs were last scanned for health data by the FDE 219. In block 603, the FDE receives an XSD response packet from the VIOS 209A. The XSD response packet may include data for LPARs that need attention, e.g., LPARs that have missed heartbeats. An example LPAR response packet such as may be received in block 603 is discussed below with respect to FIG. 8. In block 604, the FDE 219 updates the LPAR and VIOS health data 220 for any LPARs that were included in the XSD response packet, indicating the included LPARs were reported as having missed heartbeat data in the most recent scan, as indicated by the scan counter.

Next, in block 605, the FDE 219 updates the LPAR and VIOS health data 220 for any LPARs that were not included in the XSD response packets. LPARs that were not included in the XSD response packet are assumed to be healthy as of the most recent scan, so, for each LPAR that was not included in the XSD response packet, the LPAR's entry is marked as healthy and updated to include the current scan counter value. In some embodiments, only data for LPARs located in the same island as the VIOS 209A that sent the XSD response packet are updated in block 605. From block 605, flow proceeds to block 606, in which the FDE 219 determines whether to relocate any LPAR in the system 200 based on the LPAR and VIOS health data 220. The LPAR relocation decision is discussed in further detail below with respect to FIGS. 7A-B.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7A:
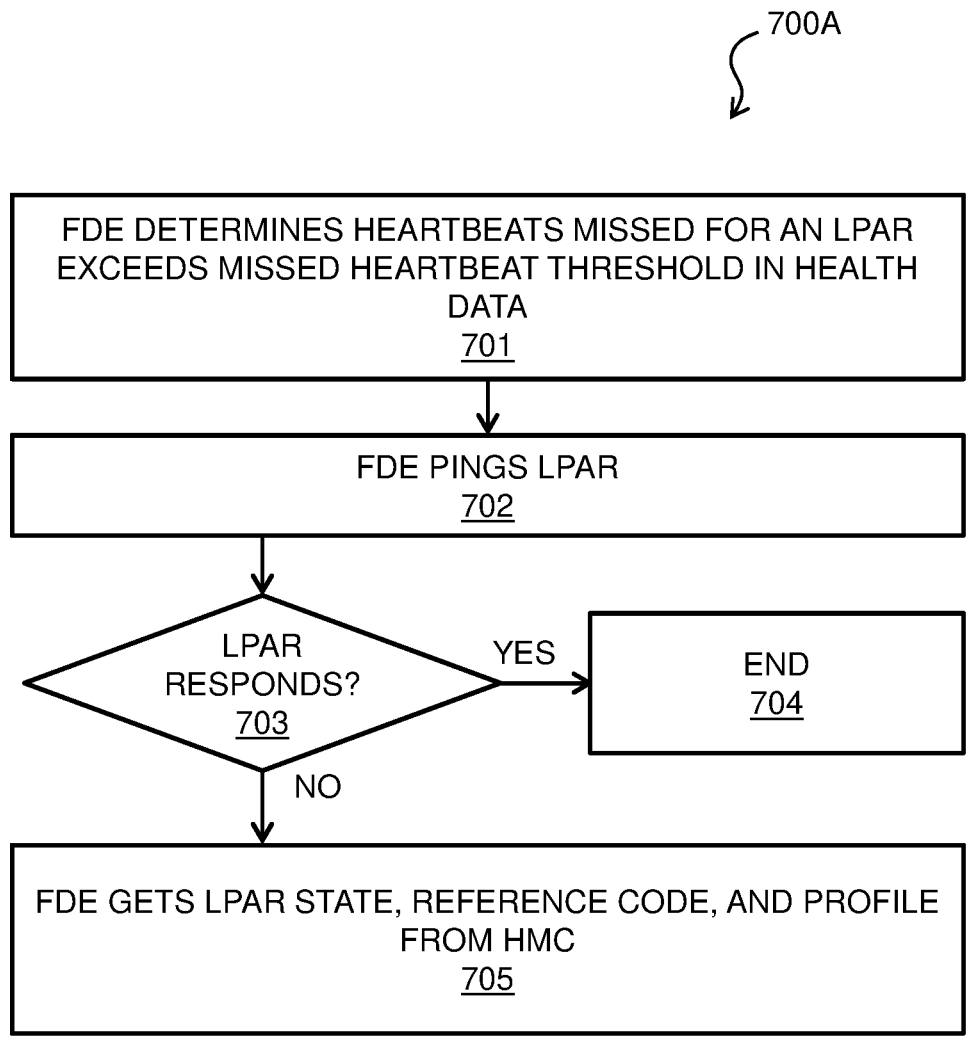
FIGS. 7A-B are process flow diagrams of an example method for LPAR monitoring and relocation for failure detection for CEC group management.
Figure 7B:
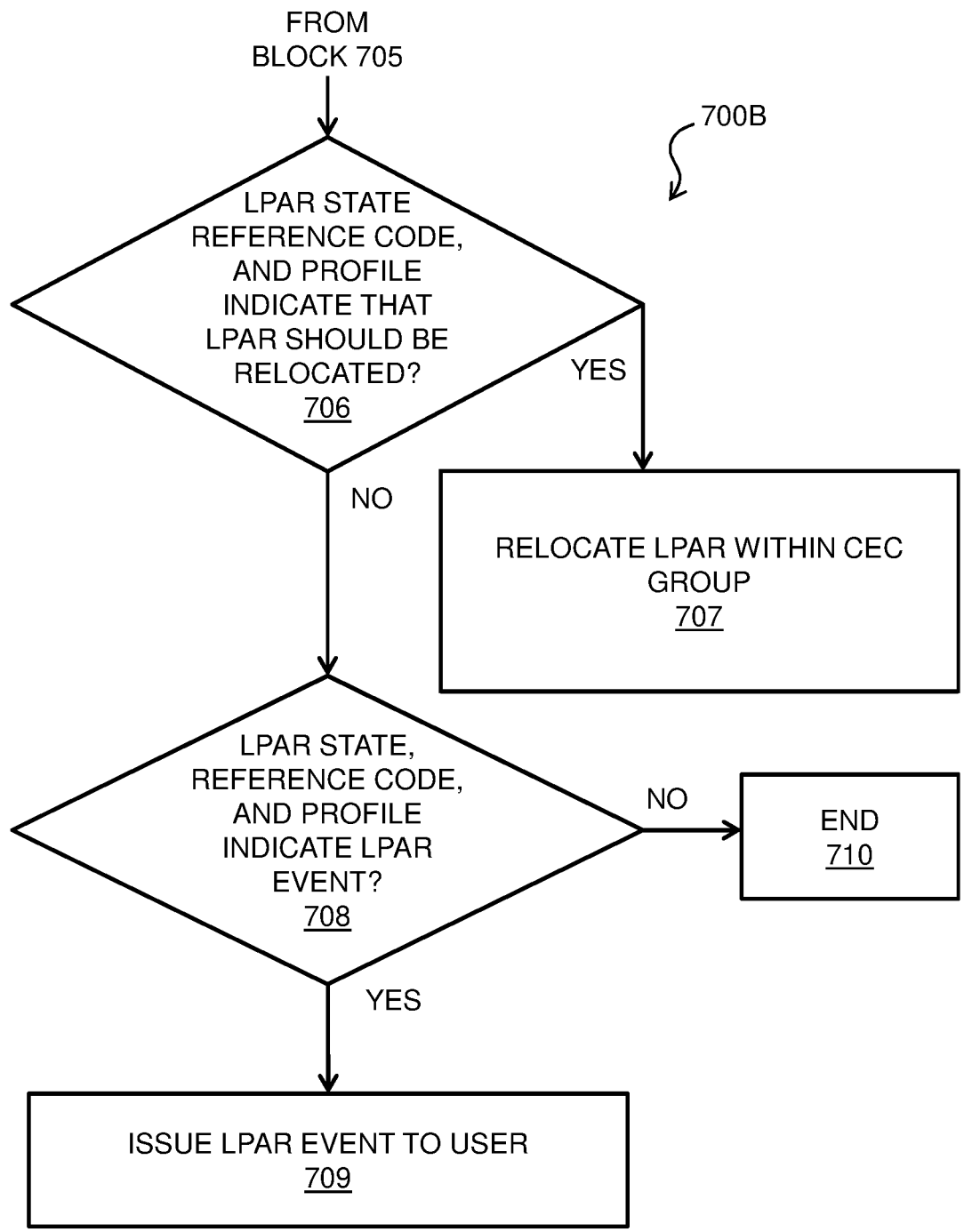

FIGS. 7A-B are a process flow diagrams of an example method for LPAR relocation for failure detection for CEC group management. The methods 700A-B can be implemented in a system such as system 200 of FIG. 2, in conjunction with any suitable computing device, such as the computer system 100 of FIG. 1. Methods 700A-B of FIGS. 7A-B may be performed in block 606 of method 600 of FIG. 6. In block 701 of FIG. 7A, the FDE 219 determines based on the LPAR and VIOS health data 220 that an LPAR (for example, LPAR 205A) has missed a number of heartbeats that is higher than a missed heartbeat threshold. The missed heartbeat threshold may be any appropriate number in various embodiments. In block 702, the FDE 219 attempts to ping the LPAR 205A that was identified in block 701. In some embodiments, the FDE 219 may not have permission to directly ping the LPARs in CEC group 201 due to security concerns. It is then determined in block 703 whether there is any response to the ping from the LPAR 205A. If there is a response from the LPAR 205A in block 703, flow proceeds from block 703 to block 704, and method 700A ends. If it is determined in block 703 that there was no response from the LPAR 205A, flow proceeds from block 703 to block 705. In block 705, the FDE 219 requests an LPAR state, a reference code, and a profile for the LPAR 205A from an HMC (such as HMC 217A) of HMCs 217A-B. The HMC 217A sends the LPAR state, reference code, and profile that are stored in the HMC 217A for the particular LPAR 205A to the FDE 219 in block 705.

From block 705 of method 700A, flow proceeds to block 706 of method 700B of FIG. 7B. In block 706, the FDE 219 determines based on the LPAR state, reference code, and profile that were received from the HMC 217A in block 705 whether relocate the LPAR 205A. In some embodiments, it is determined in block 706 that the LPAR should be relocated if: the LPAR state is not activated, the missed heartbeats are greater than the twice the missed heartbeat threshold, and the reference code is NULL (which indicates that an administrator of the CEC group 201 did not put the LPAR in the down state intentionally). In some embodiments, it is determined in block 706 that the LPAR should be relocated if: the LPAR is Open Firmware, the missed heartbeats are greater than the missed heartbeat threshold, and the boot mode in the profile is not System_Management_Services (which indicates that an administrator of the CEC group 201 did not put the LPAR in the down state intentionally).

If it is determined in block 706 that the LPAR state, reference code, and profile indicate that the LPAR 205A should be relocated, flow proceeds from block 706 to block 707. In block 707, the FDE 219 instructs the controller system 218 to relocate the LPAR 205A to a different CEC (e.g., CEC 202A or 202C) in the system 200. The controller system 218 may instruct the HMC 217A to create and start up a new profile corresponding to the LPAR 205A in the CEC to which the LPAR is being relocated. The controller system 218 may select the CEC to which the LPAR 205A is moved based on the available resources in the CEC, in order to ensure that the LPAR is not moved to a CEC that does not have sufficient resources to support the LPAR.

If it is determined in block 706 that the LPAR state, reference code, and profile indicate that the LPAR 205A should not be relocated, flow proceeds from block 706 to block to block 708. In block 708, it is determined whether the LPAR state, reference code, and profile indicate that an LPAR event should be generated to notify a user, such as an administrator of the CEC group 201, of possible problems with the LPAR 205A. In some embodiments, it is determined in block 708 that an LPAR event should be generated if: the LPAR state is in migration mode and the heartbeats have been missed for more than 24 hours (e.g., a live migration of the LPAR is taking place and 24 hours have passed). In some embodiments, it is determined in block 708 that an LPAR event should be generated if: the LPAR state is any of "not available", "error", "shutdown", "hardware discovery" and "inactive migration"; and the missed heartbeats are greater than the twice the missed heartbeat threshold.

If it is determined in block 708 that an LPAR event is indicated, flow proceeds from block 708 to block 709, in which an LPAR event is generated and communicated to notify a user, such as an administrator of the CEC group 201, of possible problems with the LPAR 205A. If it is determined in block 708 that an LPAR event is not indicated, flow proceeds from block 708 to block 710, and method 700B ends.

The process flow diagrams of FIGS. 7A-B are not intended to indicate that the operations of the methods 700A-B are to be executed in any particular order, or that all of the operations of the methods 700A-B are to be included in every case. Additionally, the methods 700A-B can include any suitable number of additional operations.

FIG. 8 illustrates example embodiments of a VIOS response packet 801 corresponding to a VIOS probe, and an LPAR response packet 802 corresponding to an LPAR probe. VIOS response packet 801 is an XSD packet, and includes VIOS status data for four VIOSes, which may correspond to all of the VIOSes in an island corresponding to the VIOS that sent the XSD packet. VIOS response packet 801 includes VIOS identifiers, and associated state data for each of the listed VIOSes. LPAR response packet 802 is an XSD packet, and includes LPAR data for four LPARs, which may be a subset of the LPARs in an island corresponding to the VIOS that sent the LPAR response packet 802. LPARs in the island corresponding to LPAR response packet that are not included in LPAR response packet 802 are assumed to be healthy by the FDE 219. LPAR response packet 802 includes LPAR identifiers; data regarding the state of each of the listed LPARS; and which heartbeats were missed by each of the listed LPARs. Response packets 801 and 802 of FIG. 8 are shown for illustrative purposes only; a response packet as discussed herein may have any appropriate format and include any appropriate information in various embodiments.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   issuing, via a processor, a first virtual input/output server (VIOS) probe to a hardware management console (HMC) of a central electronics complex (CEC) group, wherein the CEC group comprises a plurality of CECs, and wherein each CEC comprises at least one respective VIOS;
   receiving a first response packet from the HMC corresponding to the first VIOS probe, wherein the first response packet comprises health data corresponding to a plurality of VIOSes of the CEC group;
   determining, based on the first response packet, that cluster down is indicated on a first VIOS associated with a first CEC;
   based on determining that cluster down is indicated on the first VIOS, getting a VIOS state for the first VIOS from the HMC;
   determining based on the VIOS state from the HMC that the first VIOS is in a down state;
   based on determining that the first VIOS is in the down state, determining that the first VIOS is unhealthy; and
   updating a first health data entry corresponding to the first VIOS to indicate that the first VIOS is unhealthy.

2. The method of claim 1, wherein each CEC of the plurality of CECs comprises two respective VIOSes, and the processor is configured to:
   determine that a second VIOS associated with the first CEC is unhealthy based on a second health data entry corresponding to the second VIOS;
   based on determining that the first VIOS and the second VIOS are unhealthy, issue a second VIOS probe to the first VIOS, and issuing a third VIOS probe to the second VIOS; and
   based on receiving no response to the second VIOS probe and the third VIOS probe, relocate a plurality of LPARs associated with the first CEC to another CEC in the CEC group.

3. The method of claim 1, further comprising:
   issuing a first logical partition (LPAR) probe to the HMC, wherein the CEC group comprises a plurality of LPARs;
   receiving a second response packet from the HMC corresponding to the first LPAR probe, wherein the second response packet comprises health data corresponding to a first LPAR of the plurality of LPARs; and
   storing the health data corresponding to the first LPAR in a third health data entry corresponding to the first LPAR.

4. The method of claim 3, the processor configured to:
   periodically issue VIOS probes to the HMC based on a VIOS query time period; and
   periodically issue LPAR probes to the HMC based on an LPAR query time period;
   wherein the VIOS query time period is shorter than the LPAR query time period.

5. The method of claim 3, wherein the health data corresponding to the first LPAR indicates that the first LPAR has missed at least one heartbeat.

6. The method of claim 3, further comprising:
   for a second LPAR of the plurality of LPARs that was not included in the second response packet, updating, via the processor, a fourth health data entry corresponding to the second LPAR to indicate that the second LPAR is healthy;
   incrementing a scan counter based on issuing the first LPAR probe; and
   tagging the fourth health data entry with a value of the scan counter.

7. The method of claim 3, wherein the first LPAR is located in the first CEC, and further comprising:
   determining that the first LPAR has missed a number of heartbeats that is greater than a missed heartbeat threshold based on the third health data entry;
   based on determining that the first LPAR has missed a number of heartbeats that is greater than a missed heartbeat threshold, getting an LPAR state and a reference code for the first LPAR from the HMC; and
   relocating the first LPAR to a second CEC of the CEC group based on the LPAR state and the reference code.

8. A system comprising:
   a memory having computer readable instructions; and
   one or more processors for executing the computer readable instructions, the computer readable instructions controlling the one or more processors to perform operations comprising:
   issuing a first virtual input/output server (VIOS) probe to a hardware management console (HMC) of a central electronics complex (CEC) group, wherein the CEC group comprises a plurality of CECs, and wherein each CEC comprises at least one respective VIOS;
   receiving a first response packet from the HMC corresponding to the first VIOS probe, wherein the first response packet comprises health data corresponding to a plurality of VIOSes of the CEC group;
   determining, based on the first response packet, that cluster down is indicated on a first VIOS associated with a first CEC;
   based on determining that cluster down is indicated on the first VIOS, getting a VIOS state for the first VIOS from the HMC;
   determining based on the VIOS state from the HMC that the first VIOS is in a down state;

based on determining that the first VIOS is in the down state, determining that the first VIOS is unhealthy; and updating a first health data entry corresponding to the first VIOS to indicate that the first VIOS is unhealthy.

9. The system of claim 8, wherein each CEC of the plurality of CECs comprises two respective VIOSes, and the processor is configured to:

determine that a second VIOS associated with the first CEC is unhealthy based on a second health data entry corresponding to the second VIOS;

based on determining that the first VIOS and the second VIOS are unhealthy, issue a second VIOS probe to the first VIOS, and issuing a third VIOS probe to the second VIOS; and based on receiving no response to the second VIOS probe and the third VIOS probe, relocate a plurality of LPARs associated with the first CEC to another CEC in the CEC group.

10. The system of claim 8, further comprising:

issuing a first logical partition (LPAR) probe to the HMC, wherein the CEC group comprises a plurality of LPARs;

receiving a second response packet from the HMC corresponding to the first LPAR probe, wherein the second response packet comprises health data corresponding to a first LPAR of the plurality of LPARs; and storing the health data corresponding to the first LPAR in a third health data entry corresponding to the first LPAR.

11. The system of claim 10, the one or more processors configured to:

periodically issue VIOS probes to the HMC based on a VIOS query time period; and periodically issue LPAR probes to the HMC based on an LPAR query time period;

wherein the VIOS query time period is shorter than the LPAR query time period.

12. The system of claim 10, wherein the health data corresponding to the first LPAR indicates that the first LPAR has missed at least one heartbeat.

13. The system of claim 10, further comprising:

for a second LPAR of the plurality of LPARs that was not included in the second response packet, updating, via the one or more processors, a fourth health data entry corresponding to the second LPAR to indicate that the second LPAR is healthy;

incrementing a scan counter based on issuing the first LPAR probe; and tagging the fourth health data entry with a value of the scan counter.

14. The system of claim 10, wherein the first LPAR is located in the first CEC, and further comprising:

determining that the first LPAR has missed a number of heartbeats that is greater than a missed heartbeat threshold based on the third health data entry;

based on determining that the first LPAR has missed a number of heartbeats that is greater than a missed heartbeat threshold, getting an LPAR state and a reference code for the first LPAR from the HMC; and relocating the first LPAR to a second CEC of the CEC group based on the LPAR state and the reference code.

15. A computer program product comprising a non-transitory computer readable storage medium having program instructions embodied therewith, the program instructions executable by one or more processors to cause the one or more processors to perform operations comprising:

issuing a first virtual input/output server (VIOS) probe to a hardware management console (HMC) of a central electronics complex (CEC) group, wherein the CEC group comprises a plurality of CECs, and wherein each CEC comprises at least one respective VIOS;

receiving a first response packet from the HMC corresponding to the first VIOS probe, wherein the first response packet comprises health data corresponding to a plurality of VIOSes of the CEC group;

determining, based on the first response packet, that cluster down is indicated on a first VIOS associated with a first CEC;

based on determining that cluster down is indicated on the first VIOS, getting a VIOS state for the first VIOS from the HMC;

determining based on the VIOS state from the HMC that the first VIOS is in a down state;

based on determining that the first VIOS is in the down state, determining that the first VIOS is unhealthy; and updating a first health data entry corresponding to the first VIOS to indicate that the first VIOS is unhealthy.

16. The computer program product of claim 15, wherein each CEC of the plurality of CECs comprises two respective VIOSes, and the one or more processors is configured to:

determine that a second VIOS associated with the first CEC is unhealthy based on a second health data entry corresponding to the second VIOS;

based on determining that the first VIOS and the second VIOS are unhealthy, issuing a second VIOS probe to the first VIOS, and issue a third VIOS probe to the second VIOS; and based on receiving no response to the second VIOS probe and the third VIOS probe, relocate a plurality of LPARs associated with the first CEC to another CEC in the CEC group.

17. The computer program product of claim 15, further comprising:

issuing a first logical partition (LPAR) probe to the HMC, wherein the CEC group comprises a plurality of LPARs;

receiving a second response packet from the HMC corresponding to the first LPAR probe, wherein the second response packet comprises health data corresponding to a first LPAR of the plurality of LPARs; and storing the health data corresponding to the first LPAR in a third health data entry corresponding to the first LPAR.

18. The computer program product of claim 17, the one or more processors configured to:

periodically issue VIOS probes to the HMC based on a VIOS query time period; and periodically issue LPAR probes to the HMC based on an LPAR query time period;

wherein the VIOS query time period is shorter than the LPAR query time period.

19. The computer program product of claim 17, wherein the health data corresponding to the first LPAR indicates that the first LPAR has missed at least one heartbeat.

20. The computer program product of claim 17, further comprising:

for a second LPAR of the plurality of LPARs that was not included in the second response packet, updating, via the one or more processors, a fourth health data entry corresponding to the second LPAR to indicate that the second LPAR is healthy;

incrementing a scan counter based on issuing the first LPAR probe; and tagging the fourth health data entry with a value of the scan counter.

\* \* \* \* \*